(12) United States Patent
Matsumoto et al.

(10) Patent No.: US 9,324,523 B2
(45) Date of Patent: Apr. 26, 2016

(54) POWER GENERATION DEVICE

(71) Applicant: Panasonic Intellectual Property Management Co., Ltd., Osaka (JP)

(72) Inventors: Masaharu Matsumoto, Osaka (JP); Suguru Oishi, Osaka (JP); Koichi Nagahara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/434,588

(22) PCT Filed: Oct. 7, 2013

(86) PCT No.: PCT/JP2013/005948
§ 371 (c)(1),
(2) Date: Apr. 9, 2015

(87) PCT Pub. No.: WO2014/061225
PCT Pub. Date: Apr. 24, 2014

(65) Prior Publication Data
US 2015/0279598 A1   Oct. 1, 2015

(30) Foreign Application Priority Data
Oct. 18, 2012   (JP) ................. 2012-230702

(51) Int. Cl.
| H02K 41/02 | (2006.01) |
| H01H 47/22 | (2006.01) |
| H02K 35/02 | (2006.01) |
| H02K 7/18 | (2006.01) |
| H01H 45/00 | (2006.01) |

(52) U.S. Cl.
CPC .............. *H01H 47/22* (2013.01); *H01H 45/00* (2013.01); *H02K 7/1853* (2013.01); *H02K 35/02* (2013.01); *H01H 2239/076* (2013.01)

(58) Field of Classification Search
CPC  H02K 7/1869; H02K 35/02; H01H 2239/076
USPC .............. 310/12.01, 12.12, 12.21, 12.27, 14; 335/205
See application file for complete search history.

(56) References Cited

U.S. PATENT DOCUMENTS

| 7,659,641 B2* | 2/2010 | Miyamoto | ............. H02K 41/03 310/12.01 |
| 2003/0234585 A1* | 12/2003 | Tu | .......................... H01F 7/021 310/12.12 |

(Continued)

FOREIGN PATENT DOCUMENTS

| JP | 3-001694 U | 1/1991 |
| JP | 2007-531482 | 11/2007 |

(Continued)

OTHER PUBLICATIONS

International Search Report of PCT application No. PCT/JP2013/005948 dated Dec. 17, 2013.

*Primary Examiner* — Thanh Lam
(74) *Attorney, Agent, or Firm* — McDermott Will & Emery LLP

(57) ABSTRACT

A power generation device includes a push button, a slider, a first spring, and a power generation unit. A first spring has a first end engaging the push button, and a second end engaging the slider. The power generation unit includes a first yoke member, a second yoke member, and a coil. The second yoke member includes a first movable member and a second movable member. The first movable member includes a first permanent magnet and is held in the slider. The second movable member includes a second permanent magnet and is held in the slider. The first yoke member is disposed between the first movable member and the second movable member. The coil is disposed to the outer periphery of the first yoke member.

10 Claims, 18 Drawing Sheets

(56) References Cited

U.S. PATENT DOCUMENTS

2007/0278866 A1* 12/2007 Ida .................. B23Q 11/0025
  310/12.25
2008/0246346 A1  10/2008 Harris et al.

FOREIGN PATENT DOCUMENTS

| JP | 2010-283948 | 12/2010 |
| JP | 2010-283970 | 12/2010 |
| JP | 2011-115037 | 6/2011 |

* cited by examiner

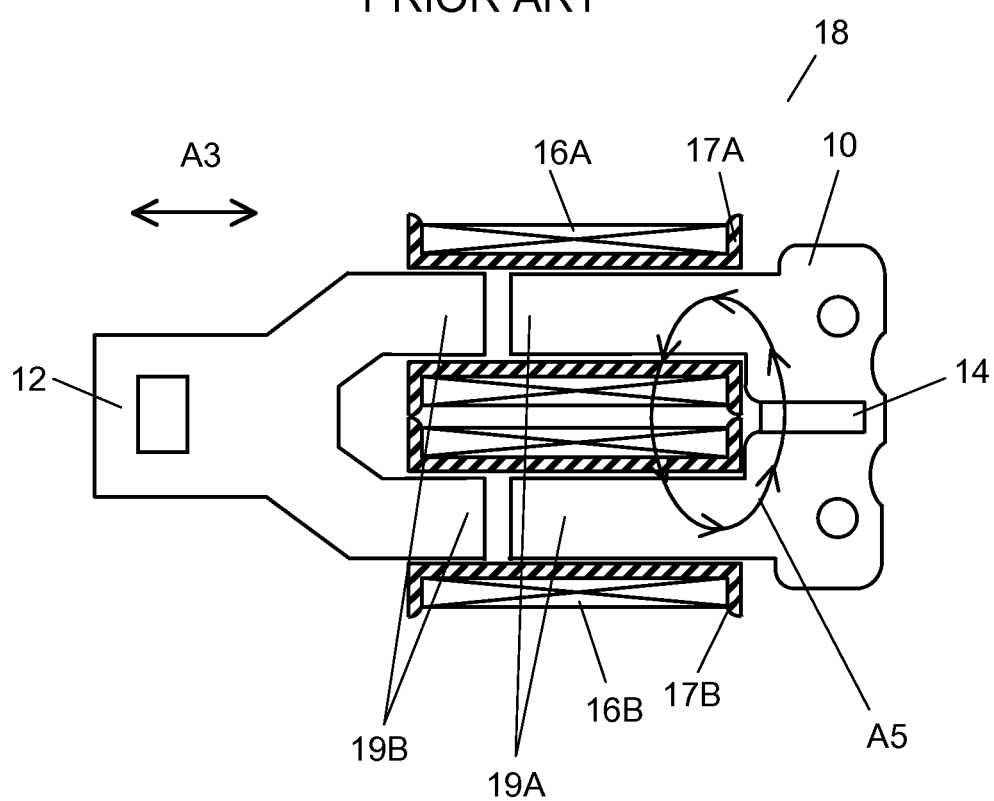

POWER GENERATION DEVICE

This application is a U.S. national stage application of the PCT international application No. PCT/JP2013/005948.

TECHNICAL FIELD

The present technical field relates to a power generation device used in various electronic apparatuses.

BACKGROUND ART

Recently, wall switches for remotely operating electronic apparatuses such as a lighting apparatus have been developed. The leading wall switches include a switch for supplying an electronic apparatus with electric power via a power line. In addition to such a switch, a switch incorporating a power generation device has been proposed. In the switch incorporating a power generation device, by pushing down a push button as an operation part, the power generation device works. Then, a remote control signal is transmitted to a lighting apparatus by electric power generated by the power generation device, and the lighting apparatus is turned on and off.

FIG. 15 is a cut-away sectional view of a conventional power generation device. FIG. 16 is a cut-away perspective view of the conventional power generation device.

Push button 2 is disposed to case 1 in such a manner that it can be pushed down in an A1 direction (see, FIG. 16).

Rotary member 5 rotates in a predetermined direction in response to movement of push button 2 in the A1 direction. Rotation of rotary member 5 is intermittently conveyed to swing arm 6, and thereby swing arm 6 swings around spindle 7 as a center in an arrow A2 direction.

Case 1 houses electromagnetic induction type power generation unit 18. FIGS. 17 and 18 are plan views of power generation unit 18. Power generation unit 18 includes fixed yoke 10 and movable yoke 12. Fixed yoke 10 has forked arm portion 19A extending from permanent magnet 14. Movable yoke 12 has extending forked arm portion 19B. Movable yoke 12 moves in the horizontal direction such that the tip of arm portion 19B of movable yoke 12 is brought into contact with the corresponding tip of arm portion 19A of fixed yoke 10. Then, arm portions 19A and 19B are inserted into coils 16A and 16B. Note here that coils 16A and 16B are provided with members 17A and 17B, respectively. Movable yoke 12 is connected to swing arm 6 at connection section 8 (see, FIGS. 15 and 16). A conventional power generation device is configured as described above. Next, an operation of the conventional power generation device is described.

When push button 2 is pushed down in the A1 direction, rotary member 5 rotates, and swing arm 6 swings several times intermittently. Since movable yoke 12 is connected to swing arm 6 at connection section 8, movable yoke 12 reciprocates in the horizontal direction (in a direction of arrow A3) in response to the swinging of swing arm 6 (see FIGS. 17 and 18). Through this reciprocating movement, a predetermined electromotive force is obtained from power generation unit 18.

That is to say, movable yoke 12 reciprocates horizontally, so that a state in which the tip of arm portion 19A of fixed yoke 10 and the tip of arm portion 19B of movable yoke 12 are brought into contact with each other (see, FIG. 17) is changed to a state in which the both tips are separated from each other (see, FIG. 18), or, on the contrary, a state in which the tips are separated from each other is changed to a state in which the tips are brought into contact with each other. Accordingly, a main flow of a magnetic flux flowing from permanent magnet 14 is changed as shown in arrow A4 in FIG. 17 and arrow A5 in FIG. 18. In response to the change of the magnetic flux, a predetermined electromotive force is obtained from coils 16A and 16B.

Note here that prior art literatures on the present application include, for example, Patent Literatures 1 and 2.

CITATION LIST

Patent Literature

PTL 1: Japanese Patent Application Unexamined Publication No. 2010-283970

PTL 2: Japanese Patent Application Unexamined Publication No. 2010-283948

SUMMARY OF THE INVENTION

A power generation device includes a push button, a slider disposed in a direction in which the push button is pushed, a first spring, and a power generation unit. The first spring has a first end engaging the push button, and the second end engaging the slider. The power generation unit includes a first yoke member, a second yoke member, and a coil. The second yoke member includes a first movable member and a second movable member. The first movable member includes a first permanent magnet and is held in the slider. The second movable member includes a second permanent magnet and is held in the slider. The first yoke member is disposed between the first movable member and the second movable member. The coil is disposed to an outer periphery of the first yoke member. A restoring force, accumulated in response to movement of the push button, of the first spring moves the first movable member and the second movable member together with the slider, so that positions of the first movable member and the second movable member relative to the first yoke member are changed, and a direction of a magnetic flux flowing in the first yoke member is changed.

BRIEF DESCRIPTION OF DRAWINGS

FIG. 18 is a plan view of the conventional power generation unit.

DESCRIPTION OF EMBODIMENTS

Figure 15:
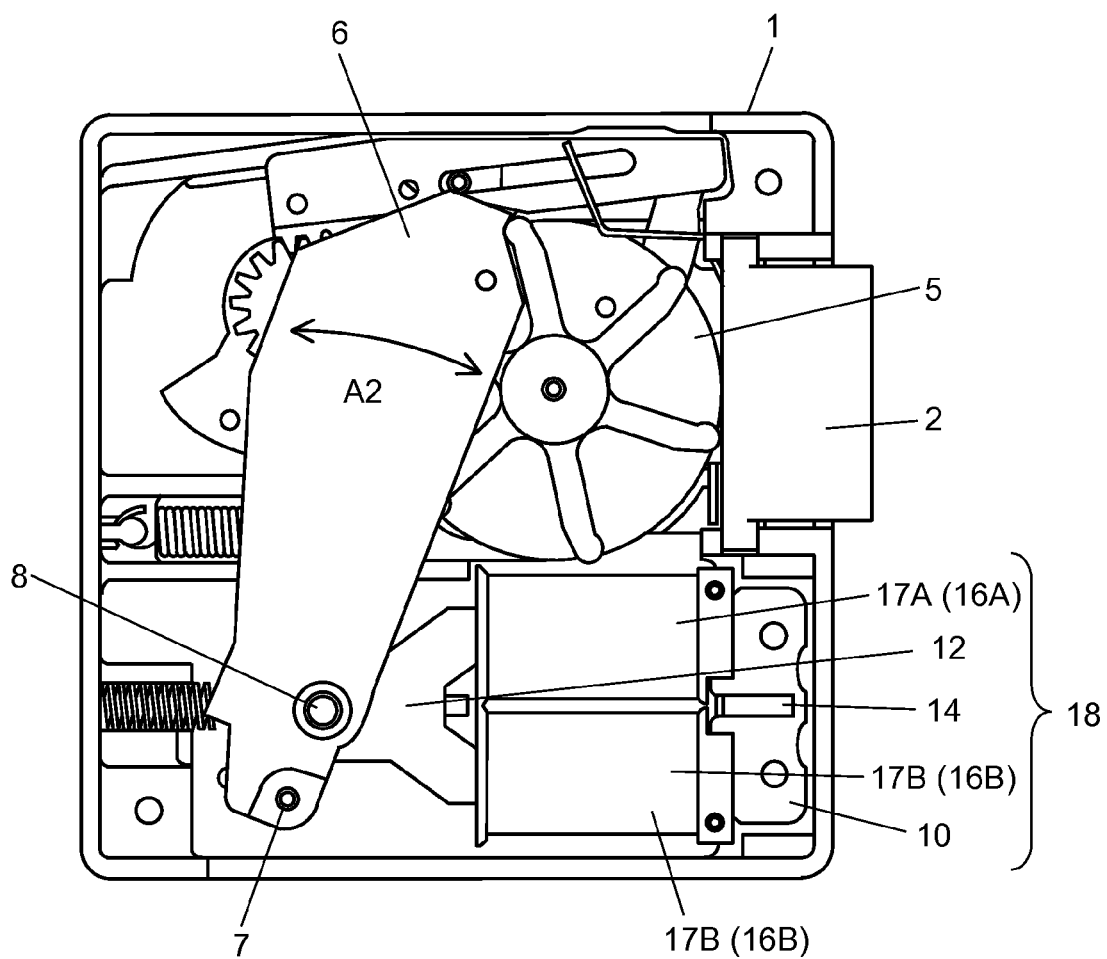
FIG. 15 is a cut-away sectional view of a conventional power generation device.
Figure 16:
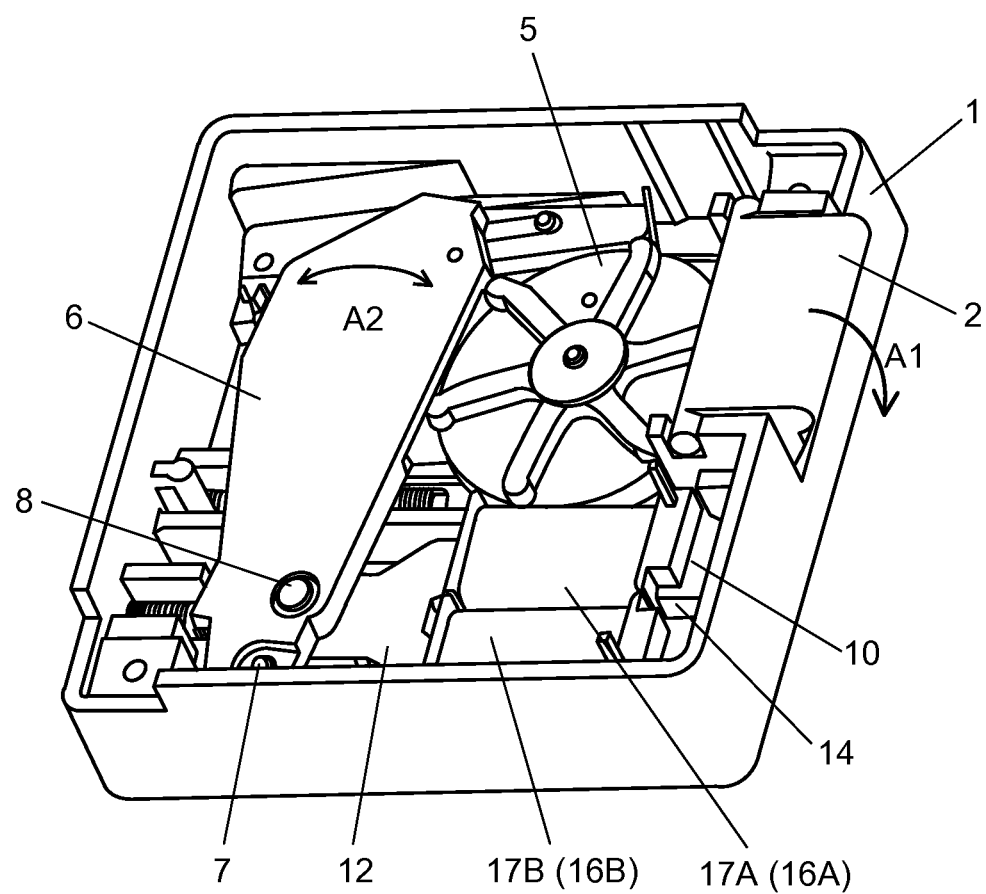
FIG. 16 is a cut-away perspective view of the conventional power generation device.
Figure 17:
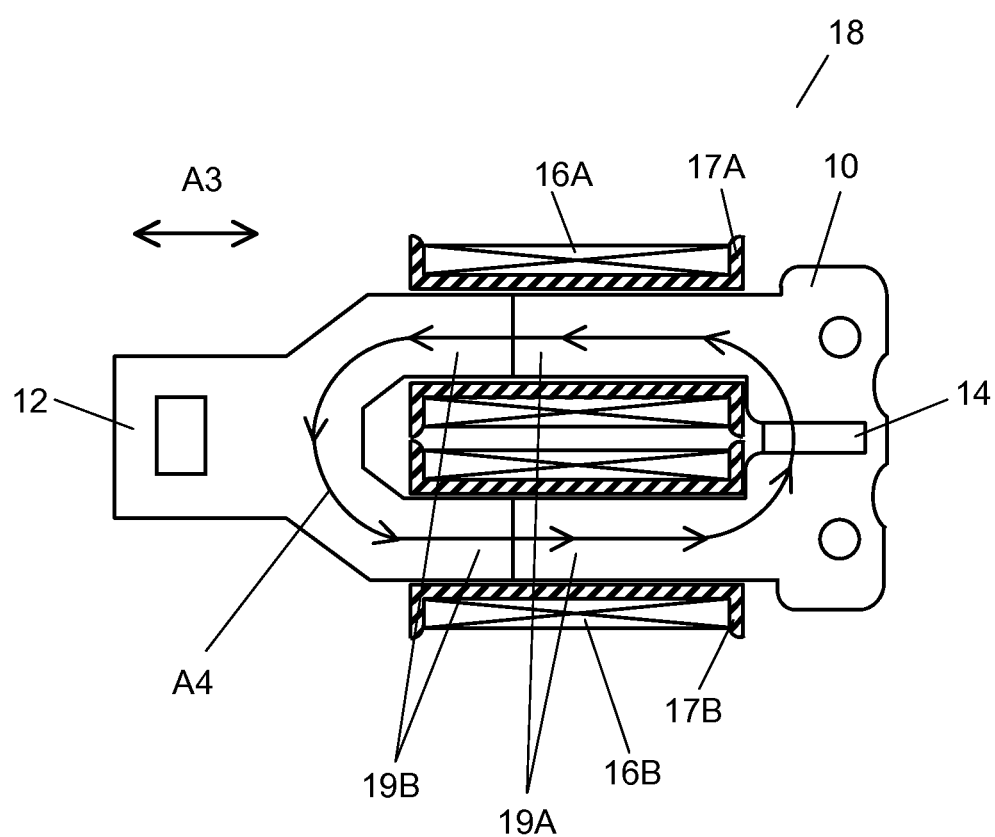
FIG. 17 is a plan view of the conventional power generation unit.

In a conventional switch shown in FIGS. 15 and 16, in order to work movable yoke 12, it is necessary to combine a large number of members such as rotary member 5 and swing arm 6. Therefore, a conventional switch has a complicated structure, includes a large number of components, and is expensive.

Figure 1:
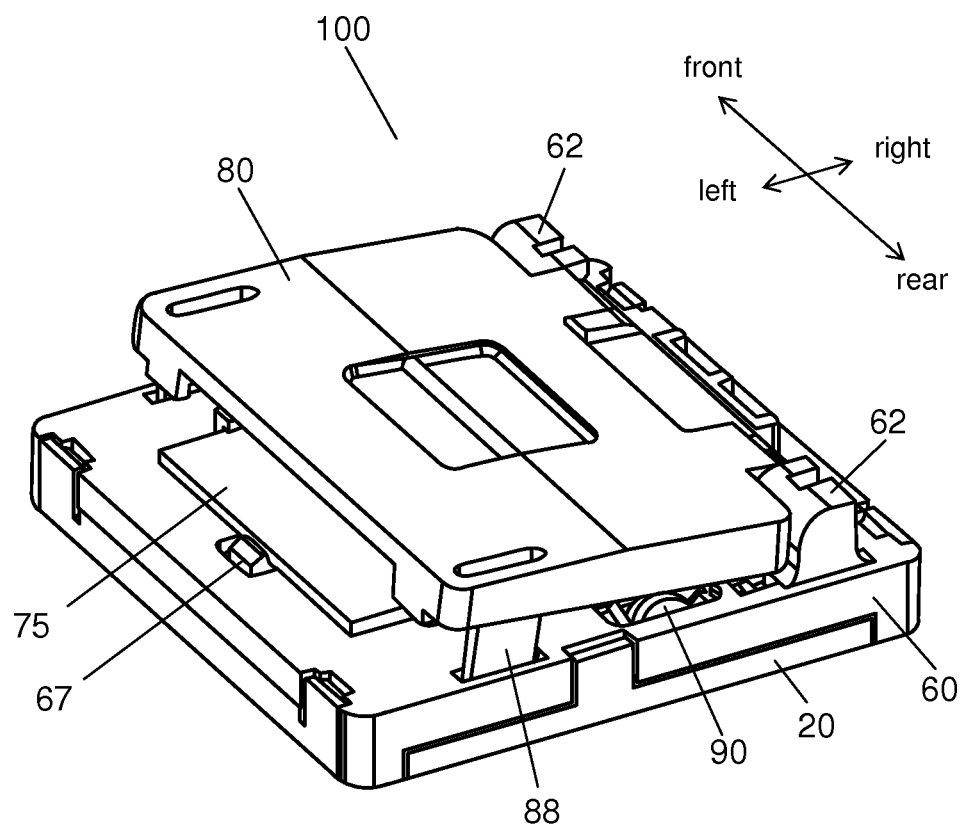
FIG. 1 is an outline view of a power generation device in accordance with an exemplary embodiment.
Figure 2:
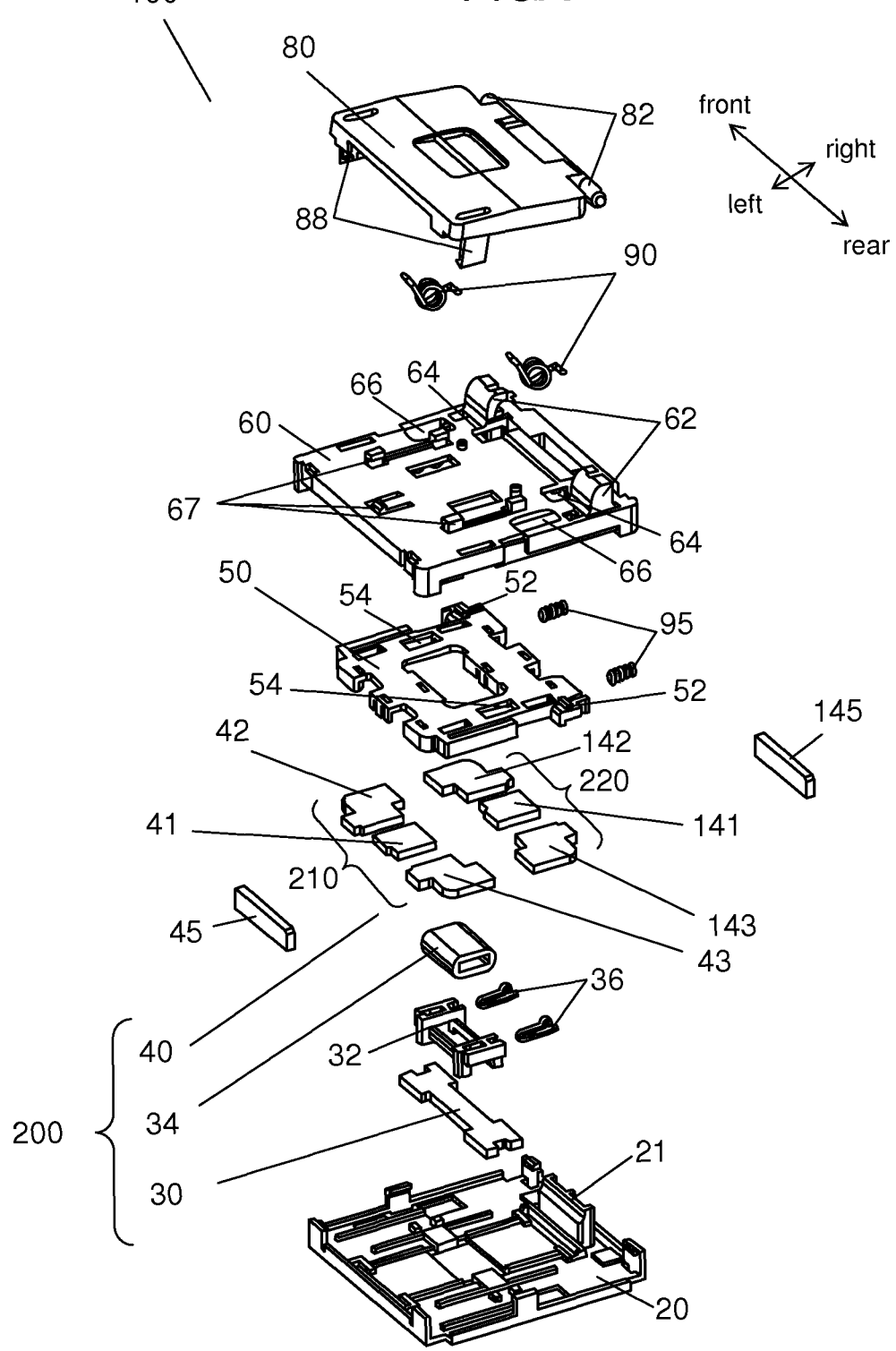
FIG. 2 is an exploded perspective view of the power generation device in accordance with this exemplary embodiment.
Figure 3:
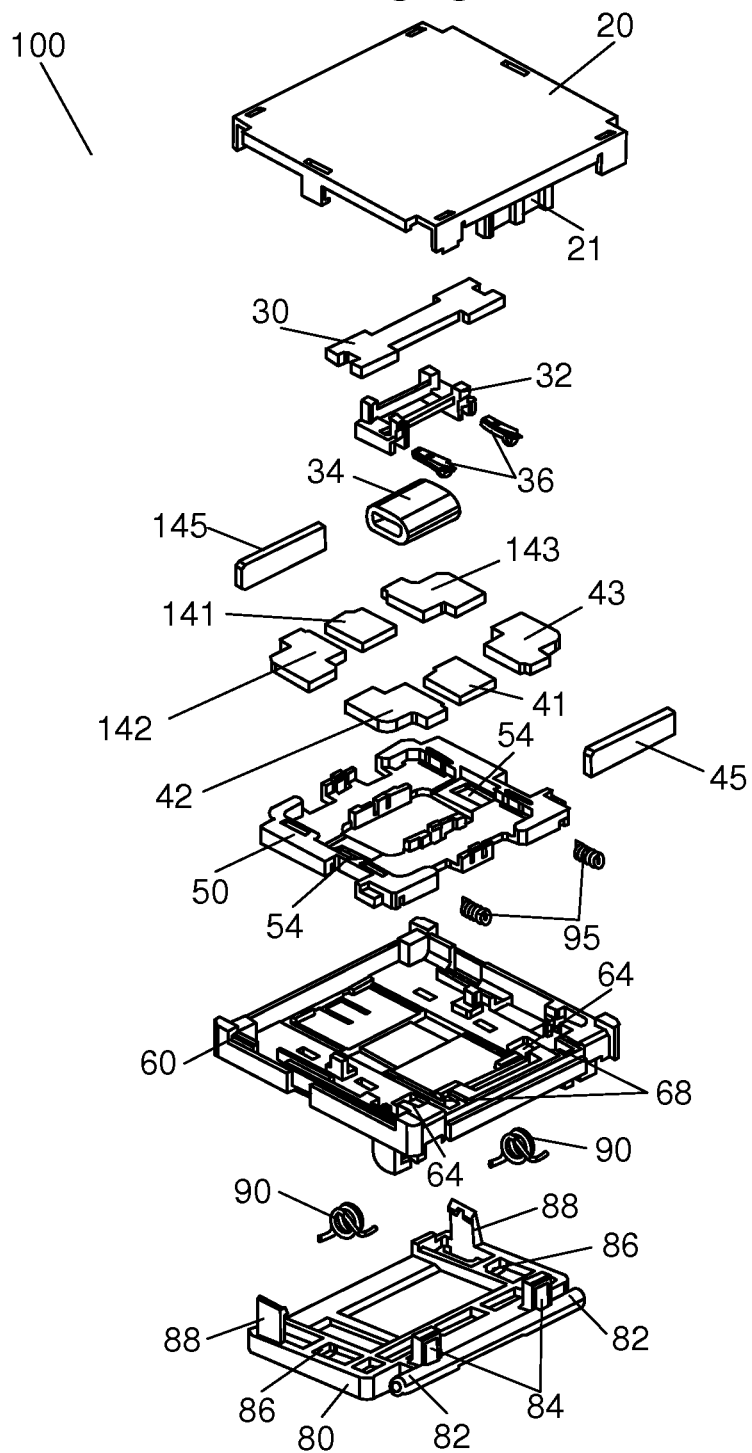
FIG. 3 is an exploded perspective view of the power generation device seen from below in accordance with this exemplary embodiment.
Figure 4:
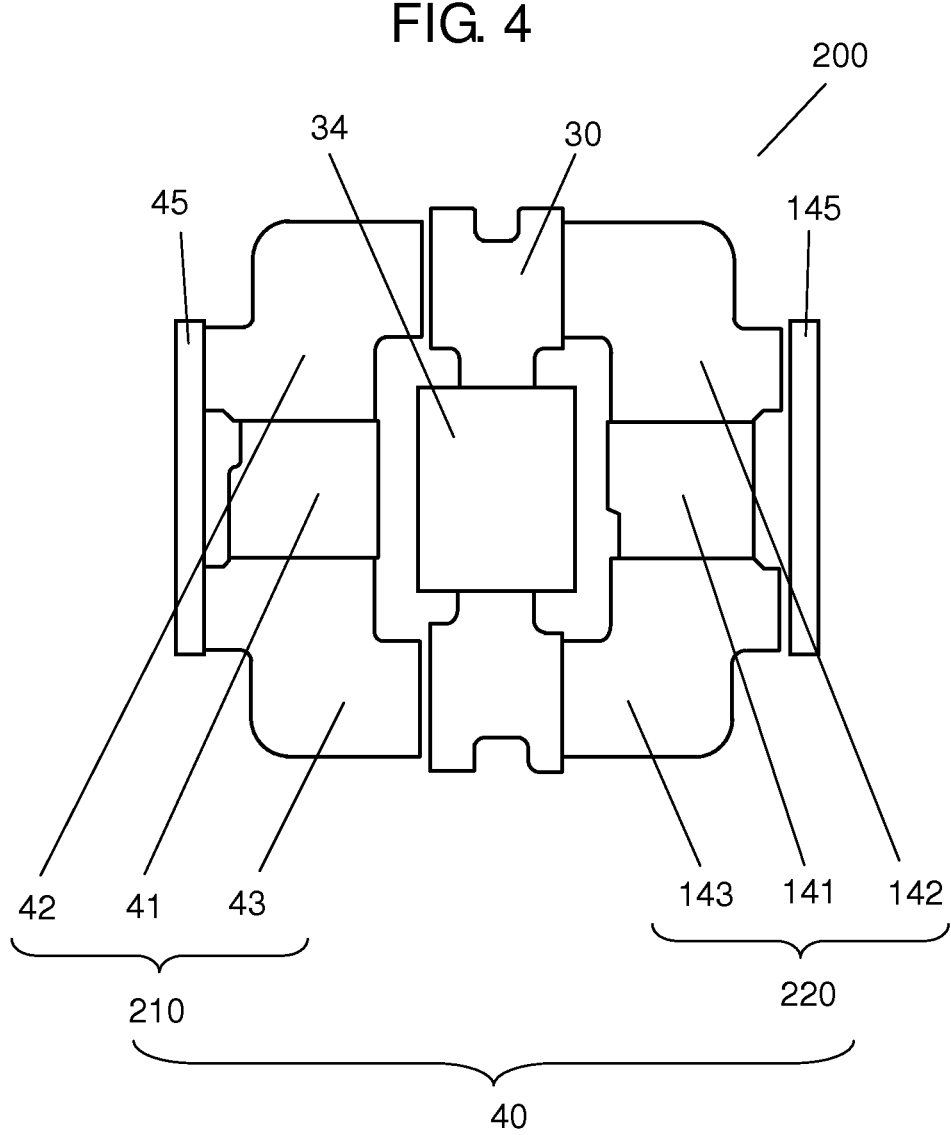
FIG. 4 is a top view of a power generation unit in a stopped state in accordance with this exemplary embodiment.
Figure 5:
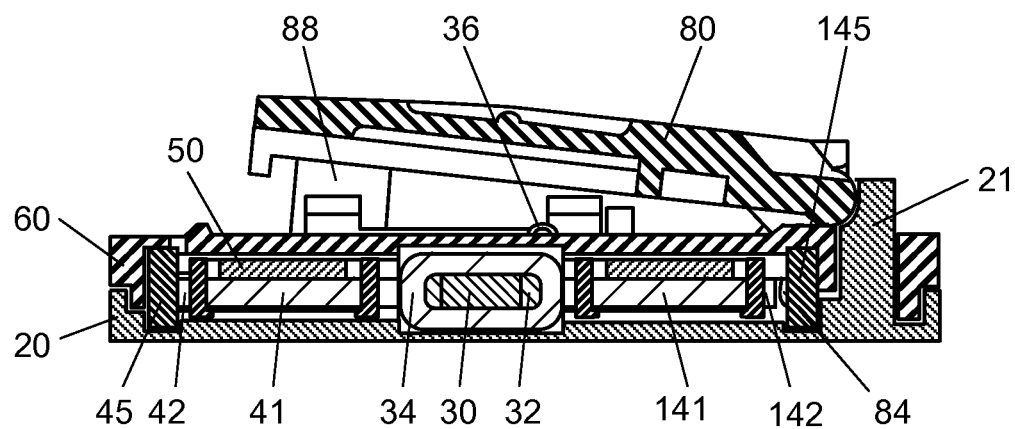
FIG. 5 is a sectional view taken at a position that crosses a permanent magnet and a coil of the power generation device in the stopped state in accordance with this exemplary embodiment.
Figure 6:
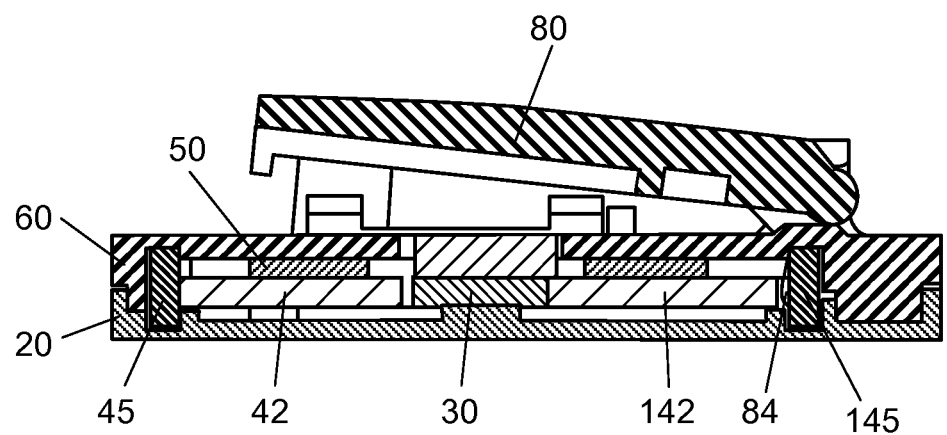
FIG. 6 is a sectional view taken at a position that crosses front yokes and a first yoke member of the power generation device in the stopped state in accordance with this exemplary embodiment.
Figure 7:
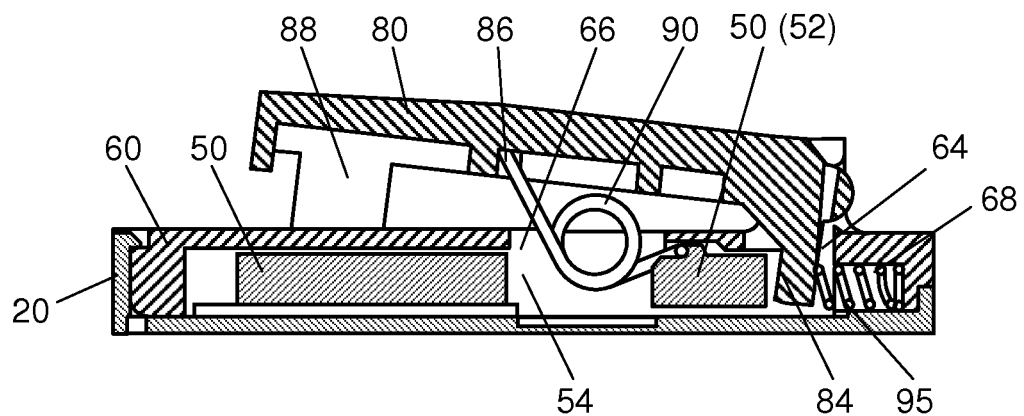
FIG. 7 is a sectional view taken at a position that crosses a first spring and a second spring of the power generation device in the stopped state in accordance with this exemplary embodiment.

FIG. 1 is an outline view of power generation device 100 in accordance with this exemplary embodiment. FIG. 2 is an exploded perspective view of power generation device 100 in accordance with this exemplary embodiment. FIG. 3 is an exploded perspective view of power generation device 100 seen from below in accordance with this exemplary embodiment. FIG. 4 is a top view of power generation unit 200 in a stopped state in accordance with this exemplary embodiment. FIG. 5 is a sectional view taken at a position that crosses permanent magnet 41 and coil 34 of power generation device 100 in the stopped state in accordance with this exemplary embodiment. FIG. 6 is a sectional view taken at a position that crosses front yokes 42 and 142 and first yoke member 30 of power generation device 100 in the stopped state in accordance with this exemplary embodiment. FIG. 7 is a sectional view taken at a position that crosses first spring 90 and second spring 95 of power generation device 100 in the stopped state in accordance with this exemplary embodiment. FIGS. 5 to 7 show the stopped state in which push button 80 is not pushed.

Power generation device 100 includes push button 80, slider 50 disposed in a direction in which push button 80 is pushed, first spring 90, and power generation unit 200. First spring 90 has a first end engaging push button 80 and a second end engaging slider 50. Power generation unit 200 includes first yoke member 30, second yoke member 40, and coil 34. Second yoke member 40 includes first movable member 210 and second movable member 220. First movable member 210 includes permanent magnet 41 (a first permanent magnet) and is held in slider 50. Second movable member 220 includes permanent magnet 141 (a second permanent magnet) and is held in slider 50. First yoke member 30 is disposed between first movable member 210 and second movable member 220. Coil 34 is disposed to an outer periphery of the first yoke member 30. By a restoring force of first spring 90, which is accumulated in response to movement of push button 80, first movable member 210 and second movable member 220 move together with slider 50, positions of first movable member 210 and second movable member 220 relative to first yoke member 30 are changed, and a direction of a magnetic flux flowing in first yoke member 30 is changed.

Power generation device 100 further includes lower case 20, terminal 36, and upper case 60. Resin lower case 20 is formed in a rectangular shape seen in the top view. Lower case 20 is provided with upward protrusions 21 on the right side on the top surface. Herein, as shown in FIGS. 1 and 2, a support portion 62 side (i.e., a cylindrical shaft 82 side) of push button 80 is defined as the right side, and an operation side of push button 80 is defined as the left side. Furthermore, a direction orthogonal to a right-and-left direction is defined as a front-and-rear direction. Power generation unit 200 is installed in lower case 20. First yoke member 30 is disposed to upper case 60 such that the movement in the front-and-rear and right-left directions is restricted by upper case 60. First yoke member 30 is disposed above lower case 20. Second yoke member 40 is movable.

First yoke member 30 is formed of a magnetic plate. First yoke member 30 seen in the top view is substantially rectangular-shaped and inwardly constricted in the right and left of the middle portion. Resin holder 32 is fitted into the constricted sections of first yoke member 30. Coil 34 is disposed so as to wind around the periphery of first yoke member 30 and resin holder 32. Upper case 60 is incorporated in lower case 20 such that a longitudinal side of first yoke member 30 is in the front-and-rear direction of the middle of lower case 20. First yoke member 30 is positioned above lower case 20.

Second yoke member 40 is held in an open portion of resin slider 50. First movable member 210 constituting second yoke member 40 is formed by integrating front yoke 42, permanent magnet 41, and rear yoke 43 with each other. Front yoke 42 is fixed to a front surface of permanent magnet 41, and rear yoke 43 is fixed to a rear surface of permanent magnet 41. Meanwhile, second movable member 220 is formed by integrating front yoke 142, permanent magnet 141, and rear yoke 143 with each other. Front yoke 142 is fixed to a front surface of permanent magnet 141, and rear yoke 143 is fixed to a rear surface of permanent magnet 141. Permanent magnets 41 and 141 have a rectangular parallelepiped shape. It is preferable that front yokes 42 and 142 and rear yokes 43 and 143 are formed of a magnetic plate and have the same thickness as those of permanent magnets 41 and 141, respectively. It is preferable that first movable member 210 and second movable member 220 are arranged symmetrically with respect to a line. That is to say, it is preferable that front yoke 42, permanent magnet 41, rear yoke 43, and front yoke 142, permanent magnet 141, rear yoke 143 are arranged symmetrically with respect to a line.

Permanent magnet 41 having the north pole at the front side and the south pole at the rear side, and permanent magnet 141 having the south pole at the front side and the north pole at the rear side are disposed at a predetermined interval.

Slider 50 is housed between upper case 60 and lower case 20. Slider 50 slides on lower case 20 in the right-and-left direction of FIG. 2.

Push button 80 has a top surface portion as a push-down operation surface. Cylindrical shaft 82 extending in the front-and-rear direction is disposed at the right side edge of push button 80. Furthermore, two downward protrusions 84 protruding downward are disposed in the vicinity of the right side edge of push button 80 (see FIG. 3).

The lower surface of push button 80 is provided with two recess-shaped first engagement parts 86 (see, FIG. 3). Slider 50 is provided with two protruding second engagement parts 52 at the right side with respect to first engagement parts 86 (see FIGS. 2 and 7). The top surface portion of upper case 60 is provided with relief hole 66 in a position corresponding to a winding portion in the middle of first spring 90. Furthermore, the top surface portion of slider 50 is provided with relief hole 54 in a position corresponding to the winding portion in the middle of first spring 90.

Upper case 60 has rectangular-shaped through-holes 64 in sections corresponding to downward protrusions 84, respectively (see, FIGS. 2 and 3). Downward protrusions 84 are inserted into through-holes 64 from the above, respectively. Cylindrical shaft 82 of push button 80 is rotationally movably fitted into support portions 62. Upper case 60 is made of resin.

A pair of support portions 62 protruding upward are provided on the right side on the top surface portion of upper case 60. Electronic circuit 75 (shown only in FIG. 1, and not shown in other drawings) can be set in the middle of the top surface portion upper case 60. Electronic circuit 75 is a wiring board on which, for example, an element, an electronic component, and the like, are mounted, and is operated by electric power obtained from power generation unit 200. Holding pawls 67 for allowing electronic circuit 75 to be held are provided on the top surface portion of upper case 60.

Two holding parts each holding each of terminals 36 are provided on side surfaces of resin holder 32. Two terminals 36 are inserted into the two holding parts, respectively. Both ends of a coil wire of coil 34 are soldered to two terminals 36, respectively. Terminal 36 having spring property and made of metal is formed in substantially a U shape. A semicircular upper plate of terminal 36 protrudes upward from upper case 60 (see FIG. 5). Electric power from power generation unit 200 is extracted to the outside by terminal 36. Note here that terminal 36 may protrude downward from lower case 20.

Terminal 36 protruding upward from upper case 60 is brought into contact with a predetermined position of electronic circuit 75, and thereby electronic circuit 75 is fed with electric power. However, a power-feeding method is not limited to this configuration, and electronic circuit 75 may be fed with electric power from power generation unit 200 by the other configurations. Furthermore, electronic circuit 75 may be disposed as needed, and holding pawl 67 may be disposed accordingly.

First spring 90 is formed of a torsion coil spring. As shown in FIG. 7, the first end of first spring 90 engages first engagement part 86 of push button 80. The second end of first spring 90 engages second engagement part 52 of slider 50 (see FIG. 7). The winding portion in the middle of first spring 90 is disposed in relief holes 66 and 54, in a somewhat compressed state.

Upper case 60 has recesses 68, each having a rectangular shape and opening downward, in line with through-holes 64 (see FIG. 3). In each recess 68, second spring 95 made of a coil spring is housed in a little contracted state. The left end of second spring 95 is brought into contact with the right side surface of downward protrusion 84 of push button 80, and the right end of second spring 95 is brought into contact with the right inner wall of recess 68 of upper case 60 (see FIG. 7).

As described above, push button 80 is rotationally movably disposed to upper case 60. When push button 80 is not operated and is in a stopped state, the left portion of push button 80 protrudes upward from upper case 60 by urging forces of first spring 90 and second spring 95. Upper-position restricting part 88 protrudes downward with respect to push button 80 at a position away from cylindrical shaft 82. An end pawl of upper-position restricting part 88 is locked into upper case 60, and thereby push button 80 is stopped stably with the position in the upward direction restricted. Note here that in the stopped state, there is a slight gap between the left side surface of downward protrusion 84 of push button 80 and the right side surface of slider 50 (see FIG. 7).

In this exemplary embodiment, when push button 80 is pushed down, first spring 90 move slider 50 to the right. Furthermore, first spring 90 and second spring 95 return slider 50 and push button 80 to original positions. That is to say, unlike a conventional configuration, it is not necessary to combine a large number of members, and first spring 90 and second spring 95 having a simple shape permit power generation. Herein, restoring forces of first spring 90 and second spring 95 may be selected by considering an attraction force of a power generation unit. Next, a configuration of power generation unit 200 and an operation of power generation device 100 are described.

As shown in FIG. 4, in power generation unit 200, first yoke member 30 is sandwiched between first movable member 210 and second movable member 220. Outer yoke 45 may be fixed to first movable member 210 at an opposite side to first yoke member 30. Outer yoke 145 may be fixed to second movable member 220 opposite side to first yoke member 30. That is to say, power generation unit 200 may include outer yoke 45 and outer yoke 145. Outer yokes 45 and 145 are formed of a magnetic plate.

A left end face of first movable member 210 is attracted and attached to outer yoke 45. In detail, a left end face of front yoke 42 and a left end face of rear yoke 43 are attracted and attached to outer yoke 45. A right end face of first movable member 210 is separated from an end face of first yoke member 30. In detail, a right end face of front yoke 42 and a right end face of rear yoke 43 are separated from the end face of first yoke member 30.

A left end face of second movable member 220 is attracted and attached to first yoke member 30. In detail, a left end face of front yoke 142 and a left end face of rear yoke 143 are attracted and attached to first yoke member 30. A right end face of second movable member 220 is separated from outer yoke 145. In detail, a right end face of front yoke 142 and a right end face of rear yoke 143 are separated from outer yoke 145. By these attachment forces, slider 50 holding second yoke member 40 is kept in a stable stopped state.

In power generation unit 200, a power generation amount depends on a magnetic flux flowing in first yoke member 30. Therefore, it is preferable that a magnet having a strong magnetic force is used as permanent magnets 41 and 141 of second yoke member 40. Furthermore, first movable member 210 separated from first yoke member 30 is attracted and attached to outer yoke 45. With this configuration, when the force accumulated in first spring 90 is small, slider 50 does not move and is stable.

As shown in FIG. 7, in the stopped state, first spring 90 and second spring 95 are in a little compressed state. The restoring force of first spring 90 acts on push button 80 and slider 50. The restoring force of second spring 95 acts on downward protrusion 84 of push button 80. With the restoring forces of first spring 90 and second spring 95, the left side of push button 80 is stopped at the upper most position. Furthermore, with a combination error taken into consideration, spring constants, spring lengths, contracted amounts, and the like, of first spring 90 and second spring 95 are set such that a slight gap is generated between the left side surface of downward protrusion 84 and the right side surface of slider 50. Since a force necessary for pushing down push button 80 is determined mainly by the restoring forces of first spring 90 and second spring 95, power generation device 100 whose operation force is uniform is obtained.

Figure 8:
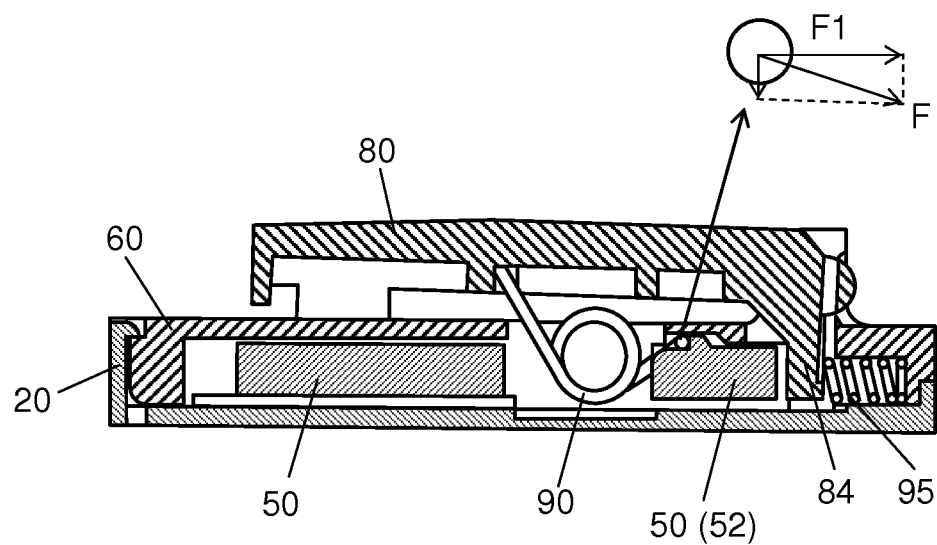
FIG. 8 a sectional view taken at a position that crosses the first spring and the second spring of the power generation device in a state in which a push button is slightly pushed in accordance with this exemplary embodiment.
Figure 9:
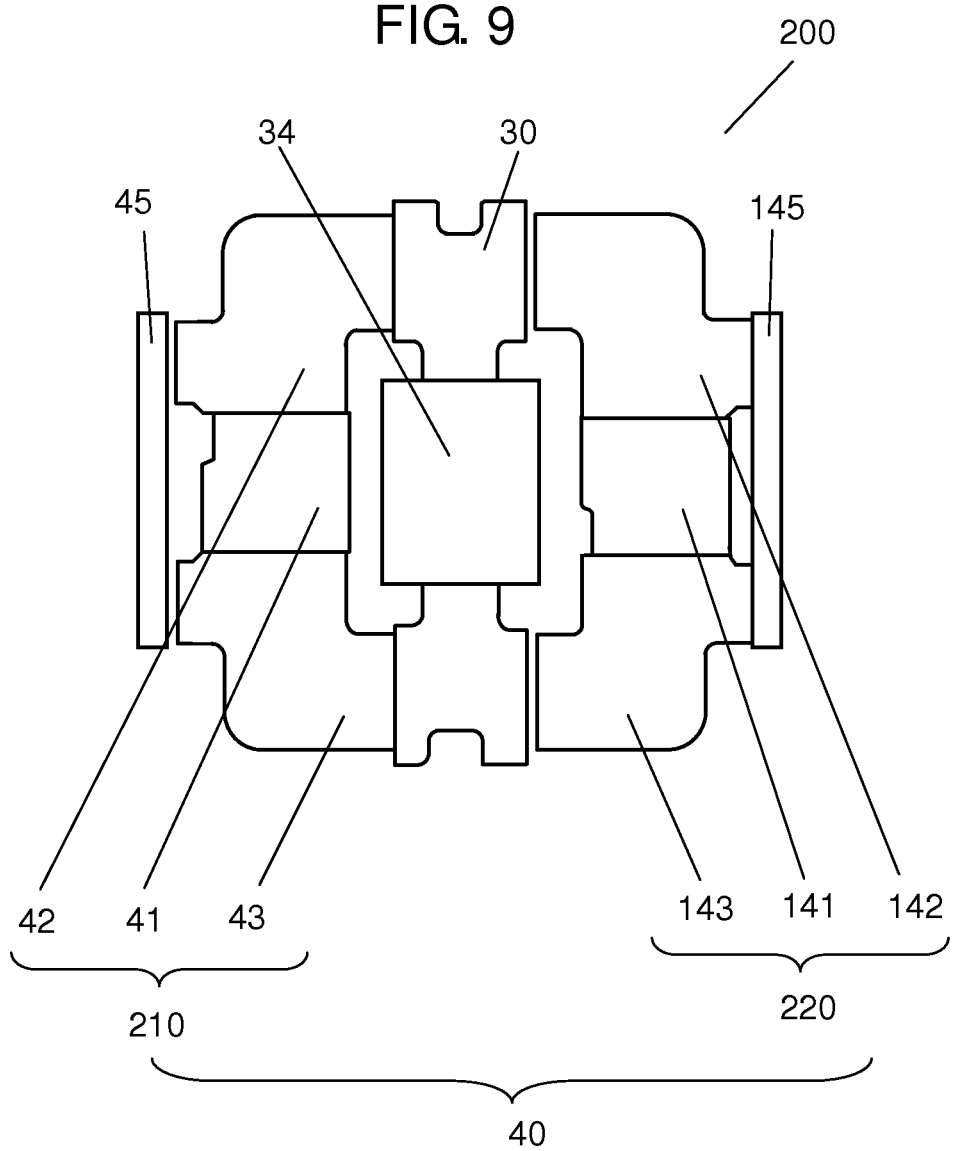
FIG. 9 is a top view of the power generation unit in a state in which the push button is completely pushed in accordance with this exemplary embodiment.
Figure 10:
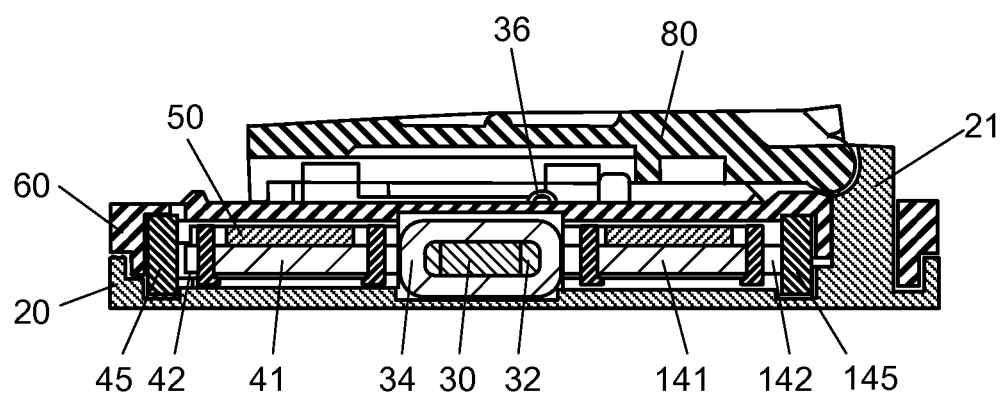
FIG. 10 is a sectional view taken at a position that crosses the permanent magnet and the coil of the power generation device in the state in which the push button is completely pushed in accordance with this exemplary embodiment.
Figure 11:
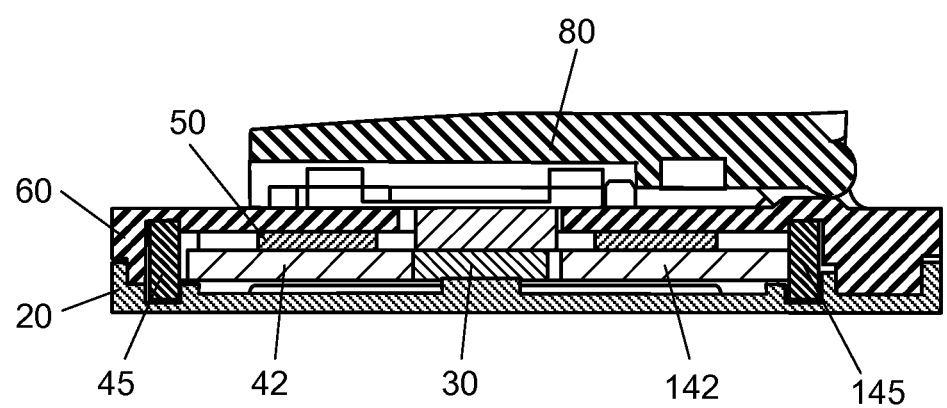
FIG. 11 is a sectional view taken at a position that crosses the front yokes and the first yoke member of the power generation device in the state in which the push button is completely pushed in accordance with this exemplary embodiment.
Figure 12:
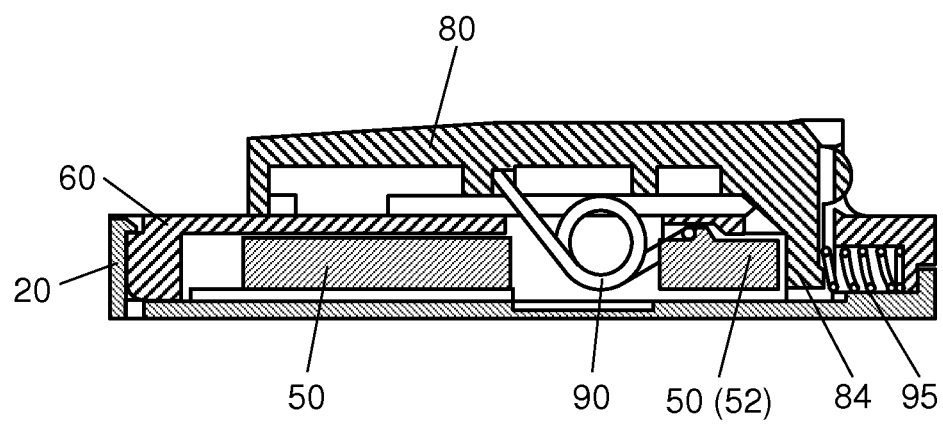
FIG. 12 is a sectional view taken at a position that crosses the first spring and the second spring of the power generation device in the state in which the push button is completely pushed in accordance with this exemplary embodiment.

FIG. 8 is a sectional view taken at a position that crosses first spring 90 and second spring 95 of power generation device 100 in a state in which push button 80 is slightly pushed. FIG. 9 is a top view of power generation unit 200 in a state in which push button 80 is completely pushed. FIG. 10 is a sectional view taken at a position that crosses permanent magnet 41 and coil 34 of power generation device 100 in the state in which push button 80 is completely pushed. FIG. 11 is a sectional view taken at a position that crosses front yokes 42 and 142 and first yoke member 30 of power generation device 100 in the state in which push button 80 is completely pushed. FIG. 12 is a sectional view taken at a position that crosses first spring 90 and second spring 95 of power generation device 100 in the state in which push button 80 is completely pushed.

FIG. 8 shows a state in which a restoring force accumulated in first spring 90 is small. When a push-down force is applied to the top surface portion of push button 80 from the stopped state, push button 80 rotationally moves around a central axis line of cylindrical shaft 82 such that the left side lowers. In response to this movement, the middle portion of push button 80 is also rotationally moves and lowers. Thus, first spring 90 bends, and second spring 95 is also pressed and contracted by downward protrusion 84 of push button 80. Note here that at the time of the initial movement, since slider 50 does not move and remains in the stopped state, space between downward protrusion 84 and the right side surface of slider 50 is widened.

A component force F1 to the horizontal direction of restoring force F accumulated in first spring 90 acts in the direction of allowing slider 50 to move to right. An engagement part between the first end of first spring 90 and push button 80 is set in the upper left part, and an engagement part between the second end and slider 50 is set in a lower right from the above-mentioned engagement part. In this way, when the engagement parts of the first end and the second end of first spring 90 are displaced vertically, the above-mentioned actions are generated.

The restoring force F acts on slider 50 in the right obliquely downward direction. Then, when the component force F1 to the horizontal direction of the restoring force F accumulated in first spring 90 is larger than a total force of the sum of the attachment force in power generation unit 200 and a frictional force generated in slider 50, in power generation unit 200, front yoke 42 and rear yoke 43 are separated from outer yoke 45. Furthermore, front yoke 142 and rear yoke 143 are separated from first yoke member 30. At the same time, the restoring force F accumulated in first spring 90 is released, slider 50 slides in the right direction by a horizontal component force F1 of the restoring force F of first spring 90. Midway of the sliding, an attraction force between first yoke member 30 and front yoke 42/rear yoke 43 as well as an attraction force between outer yoke 145 and front yoke 142/rear yoke 143 are also added. Therefore, slider 50 slides horizontally in the right direction. Thereafter, front yoke 42 and rear yoke 43 are attracted and attached to first yoke member 30, while front yoke 142 and rear yoke 143 are attracted and attached to outer yoke 145. That is to say, power generation unit 200 is changed from a state of FIG. 4 to a state of FIG. 9. In the state of FIG. 9, slider 50 is stopped.

Thus, when the attachment states in power generation unit 200 are changed, the direction of the magnetic flux flowing in first yoke member 30 is changed by 180 degrees. In other words, in power generation unit 200, when the attachment state of first yoke member 30 and second yoke member 40 is changed, the flow of the magnetic flux in first yoke member 30 is changed. That is to say, positions of first movable member 210 and second movable member 220 relative to first yoke member 30 are changed, and the direction of the magnetic flux flowing in first yoke member 30 is changed. As a result, an electromotive force is generated in coil 34 disposed to the outer periphery of first yoke member 30. The electromotive force is fed to electronic circuit 75 from terminal 36, and electronic circuit 75 works.

Push button 80 rotationally moves to a completely-pushed position, and is stopped. Note here that in order to stop push button 80 at a predetermined position, power generation device 100 may be provided with a stopper (not shown). Herein, a position at which the stopper is provided is not particularly limited, and a member with which the stopper is brought into contact is not also particularly limited.

In this exemplary embodiment, outer yokes 45 and 145 are fixed to lower case 20 such that first movable member 210 is attracted and attached to outer yoke 45, and second movable member 220 is attracted and attached to outer yoke 145. This configuration forms a magnetic flux closed in first movable member 210 and outer yoke 45 or in second movable member 220 and outer yoke 145, which are separated from first yoke member 30. As a result, the magnetic flux in first movable member 210 or second movable member 220 separated from first yoke member 30 does not easily affect first yoke member 30. Therefore, it is preferable that power generation unit 200 has outer yokes 45 and 145.

As described above, in this exemplary embodiment, by pushing-down operation of push button 80, power generation unit 200 works on the basis of the horizontal component force F1 of the restoring force F accumulated in first spring 90. Note here that at the time of pushing-down operation, click feeling is obtained in response to the operation of power generation unit 200 and an operation of first spring 90. Therefore, a user can also recognize an operation state by the click feeling.

As shown in FIG. 12, also in a state in which slider 50 is stopped after push button 80 is pushed down, a predetermined gap is provided between downward protrusion 84 of push button 80 and the right side surface of slider 50. It is preferable that a gap is provided because downward protrusion 84 is not brought into contact with slider 50 when slider 50 moves.

As push button 80 is pushed down, downward protrusion 84 moves to the right. By the movement of downward protrusion 84, second spring 95 is contracted. Then, as shown in FIG. 12, when push button 80 is completely pushed, second spring 95 is most contracted.

When a push-down force to push button 80 is released, second spring 95 is restored so as to push back downward protrusion 84 to the left. Thereby, push button 80 rotationally moves in the direction opposite to the direction in which the above-mentioned operation is carried out. Midway of the movement, downward protrusion 84 is brought into contact with slider 50, and a restoring force of second spring 95 acts as a force for moving slider 50 to the left.

The restoring force of second spring 95 is set to be larger than the attachment force in power generation unit 200. The restoring force from second spring 95 is conveyed to power generation unit 200 via slider 50, and a section to which power generation unit 200 is attracted and attached is separated by the restoring force. Slider 50 is pushed back to the position before the operation, and power generation unit 200 is also switched to the state before the operation. During this time, the restoring force of first spring 90 acts on push button 80 and slider 50, and push button 80 returns to the position before the operation.

Note here that also at this time, an electromotive force generated at coil 34 disposed to the outer periphery of first yoke member 30 can be extracted as electric power. However, a moving speed of slider 50 at the time of returning may be smaller than that when push button 80 is pushed down. Therefore, electric power obtained at the time of returning operation may be smaller than the electric power obtained at the time when push button 80 is pushed down.

When power generation device 100 is used for a wall switch of a lighting apparatus, power generation device 100 generates a wireless signal for turning on or off light in response to the push-down operation of push button 80. Specifically, electronic circuit 75 generates a wireless signal by electric power from power generation unit 200. Then, power generation device 100 transmits the wireless signal to the lighting apparatus. The lighting apparatus receives the wireless signal to turn on or off light. Note here that power generation device 100 in accordance with this exemplary embodiment may generate a wireless signal other than a signal for turning on or off light, and may be used for apparatuses other than a lighting apparatus.

As described above, power generation device 100 in accordance with this exemplary embodiment uses a simple spring as a drive mechanism. Therefore, power generation device 100 is inexpensive and is thin even in a state in which push button 80 is disposed.

In the above description, a torsion coil spring is used as first spring 90, but other springs may be used.

Figure 13:
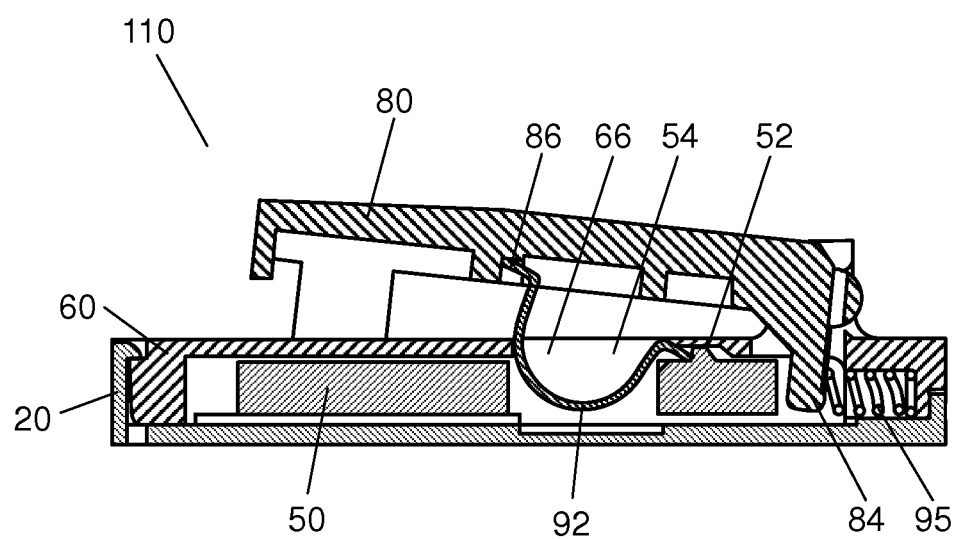
FIG. 13 is a sectional view of a second power generation device in accordance with this exemplary embodiment.
Figure 14:
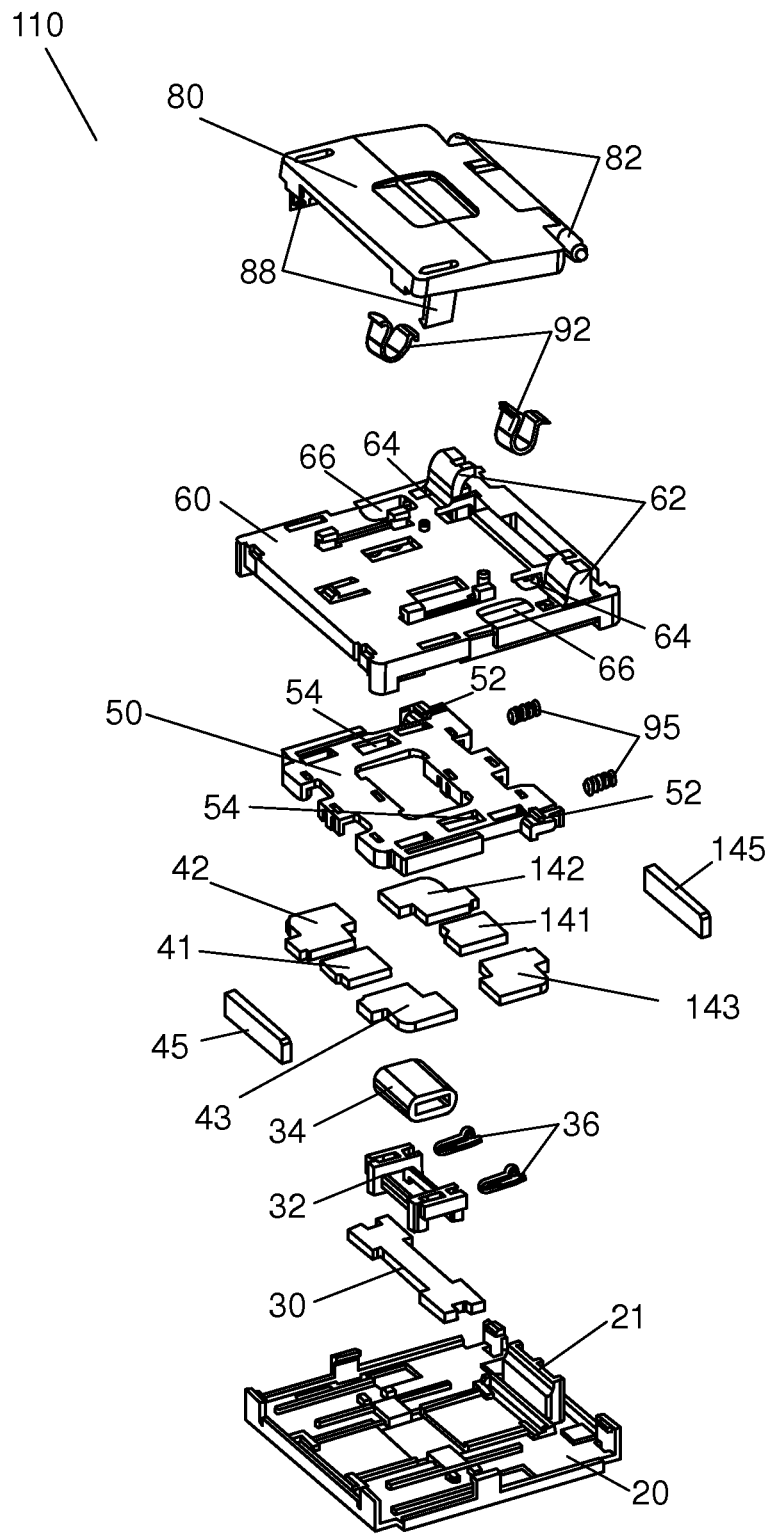
FIG. 14 is an exploded perspective view of the second power generation device in accordance with this exemplary embodiment.

FIG. 13 is a sectional view of power generation device 110 in accordance with this exemplary embodiment. FIG. 14 is an exploded perspective view of power generation device 110 in accordance with this exemplary embodiment. In FIGS. 13 and 14, plate spring 92 is used instead of first spring 90 in FIGS. 1 and 2. Plate spring 92 is made of a metal plate having spring property and folded in a U shape in the middle portion thereof to have a U-shaped portion. Plate spring 92 is disposed in such a manner that the U-shaped portion is located in the lower side. A first end of plate spring 92 is inserted into and engages first engagement part 86 of push button 80. A second end of plate spring 92 engages second engagement part 52 of slider 50. The other configurations are the same as those using first spring 90, and so detailed description thereof is omitted herein.

Use of plate spring 92 makes variation of the restoring force smaller than the case where a torsion coil spring is used. Therefore, variation of the operating force when push button 80 is pushed down is reduced. Note here that it is further preferable that plate spring 92 is provided with a fold-back portion for engagement.

Note here that power generation unit 200 is not limited to the above-described configurations, and any configurations may be employed as long as an operation of push button 80 allows slider 50 to move so as to obtain electromotive force. Furthermore, in this exemplary embodiment, second spring 95 is used as a member for returning push button 80, but other restoring means may be employed instead.

INDUSTRIAL APPLICABILITY

The present power generation device has a simple configuration and can be manufactured at a low cost, and therefore is used for various electronic apparatuses, and the like.

REFERENCE MARKS IN THE DRAWINGS 20 lower case
21 upward protrusion
30 first yoke member
32 resin holder
34 coil
36 terminal
40 second yoke member
41, 141 permanent magnet
42, 142 front yoke
43, 143 rear yoke
45, 145 outer yoke
50 slider
52 second engagement part
54, 66 relief hole
60 upper case
62 support portion
64 through-hole
67 holding pawl
68 recess
75 electronic circuit
80 push button
82 cylindrical shaft
84 downward protrusion
86 first engagement part
88 upper-position restricting part
90 first spring
92 plate spring
95 second spring
100 power generation device
110 power generation device
200 power generation unit
210 first movable member
220 second movable member

The invention claimed is:
1. A power generation device comprising:
a push button;
a slider disposed in a direction in which the push button is pushed;
a first spring having a first end engaging the push button and a second end engaging the slider; and
a power generation unit including:
a first movable member including a first permanent magnet and held in the slider;
a second movable member including a second permanent magnet and held in the slider;
a first yoke member disposed between the first movable member and the second movable member; and
a coil disposed to an outer periphery of the first yoke member,
wherein a restoring force, accumulated in response to movement of the push button, of the first spring moves the first movable member and the second movable member together with the slider, so that positions of the first movable member and the second movable member relative to the first yoke member are changed, and a direction of a magnetic flux flowing in the first yoke member is changed.
2. The power generation device of claim 1, further comprising outer yokes a first of which is disposed to the first movable member at an opposite side to a surface of the first movable member confronting the first yoke member and a second of which is disposed to the second movable member at an opposite side to a surface of the second movable member confronting the first yoke member.

3. The power generation device of claim 1, wherein
the first movable member further comprises a first front yoke and a first rear yoke,
the second movable member further comprises a second front yoke and a second rear yoke, and
the first movable member and the second movable member are disposed symmetrically with respect to a line.

4. The power generation device of claim 1, wherein north and south poles of the first permanent magnet are oriented reversely to north and south poles of the second permanent magnet.

5. The power generation device of claim 1, wherein the first spring is a torsion coil spring.

6. The power generation device of claim 1, wherein the first spring is a plate spring.

7. The power generation device of claim 1, wherein a position in which the first end of the first spring engages the push button and a position in which the second end of the first spring engages the slider are displaced from each other in a vertical direction.

8. The power generation device of claim 1, further comprising:
a case covering the slider, and
a second spring having a first end that is brought into contact with the push button and a second end that is brought into contact with the case.

9. The power generation device of claim 8, wherein the push button and the slider are moved by a restoring force of the second spring.

10. The power generation device of claim 1, wherein
before the push button is pushed, the first movable member is separated from the first yoke member, and the second movable member is brought into contact with the first yoke member, and
after the push button is pushed, the first movable member is brought into contact with the first yoke member, and the second movable member is separated from the first yoke member.

* * * * *